United States Patent [19]

Pheils, Jr.

[11] 4,231,351
[45] Nov. 4, 1980

[54] METHOD AND APPARATUS FOR SOLAR HEATING A BUILDING

[76] Inventor: David R. Pheils, Jr., 5814 Rye Mill Ct., Toledo, Ohio 43611

[21] Appl. No.: 51,385

[22] Filed: Jun. 25, 1979

Related U.S. Application Data

[63] Continuation of Ser. No. 788,115, Apr. 8, 1977, abandoned.

[51] Int. Cl.³ .............................................. F24J 3/02
[52] U.S. Cl. .................................... 126/419; 126/427;
126/429; 126/430; 52/169.11; 52/79.6
[58] Field of Search .................... 52/79.6, 79.2, 236.2,
52/169.6, 169.11, 200; 126/419, 427, 429, 430, 436

[56] References Cited

U.S. PATENT DOCUMENTS

| | | | |
|---|---|---|---|
| 3,455,069 | 7/1969 | Keyes | 52/200 X |
| 3,894,369 | 7/1975 | Schmitt et al. | 52/173 |
| 3,983,929 | 10/1976 | Thomason et al. | 126/400 X |
| 3,986,306 | 10/1976 | Trannoy | 52/79 |
| 4,010,731 | 3/1977 | Harrison | 126/400 X |
| 4,029,258 | 6/1977 | Groth | 237/1 A |
| 4,051,891 | 10/1977 | Harrison | 237/1 A X |
| 4,051,999 | 10/1977 | Granger et al. | 237/1 A |
| 4,061,267 | 12/1977 | Lof | 126/400 X |

Primary Examiner—Albert J. Makay
Assistant Examiner—William E. Tapolcai, Jr.
Attorney, Agent, or Firm—Charles R. Schaub

[57] ABSTRACT

This invention relates to a building having a central unit defined and enclosed by a peripheral main section therearound. The central unit has a transparent roof to permit the passage of solar energy therethrough to heat the air and other contents of a courtyard thereunder. The central unit also has a heat storage mass under the courtyard for storage and retrieval of energy during selected periods. The edges of the dome rest upon the walls of the main section defining the courtyard. Such walls rest upon the foundation walls defining the heat storage section containing the heat storage mass.

6 Claims, 6 Drawing Figures

METHOD AND APPARATUS FOR SOLAR HEATING A BUILDING

This is a continuation of application Ser. No. 788,115, filed Apr. 8, 1977, now abandoned.

BACKGROUND OF THE INVENTION

A building or dwelling having an efficient solar heating system and an aesthetically pleasing design whose cost is not economically unreasonable has been the goal of many efforts.

As a prerequisite to economical use of solar energy for heating, it is necessary to provide a low-cost, efficient, and trouble-free solar energy collector to capture such energy in the form of heat. Also, it is necessary to provide a low-cost, trouble-free, and effective heat storage and retrieval means to store the heat trapped by the collector and to deliver the heat to the building from the heat storage mass when needed.

To reduce the amount of heat loss to the ambient environment, the window area of the exterior walls of the structure should be kept to a minimum or even eliminated. But the lack of exterior light and viewing, generally, provides a less than aesthetically pleasing environment. Some building designs have minimized the external window area of the building and have provided a sky-light for heating an enclosed area and aesthetic purposes. For example, see U.S. Pat. Nos. 3,894,369 and 3,815,299 by Schmitt et al. and Sorenson et al., respectively. Others have employed various solar collection and heating systems of one type or another in buildings in an effort to conserve our natural resources. For example, see U.S. Pat. Nos. 3,254,702 and 3,412,728 by Harry E. Thomason. Yet, the need for a low-cost, efficient, aesthetically pleasing building having solar heating persisted.

SUMMARY OF THE INVENTION

According to the principles of this invention, there is provided a building comprising a solar energy collection section; a main section having inner walls enclosing the energy collection section; an energy storage section under the energy collection section, the storage section being defined by foundation walls, said inner walls resting upon said foundation walls; a roof covering the energy collection section adapted to permit the passage of solar energy therethrough to heat the energy collection section, said roof having the peripheral edge resting upon said inner walls; a floor spaced from the roof to separate the storage section from the collection section; and means for selectively moving air within the energy collection section through the energy storage section in a heat-exchanging relationship. Also provided is a control system for selectively directing and moving the air within the building.

Therefore, it is an object of this invention to provide a building having an inhabitable solar energy collection means enclosed by the main section of the building.

Other objects and advantages of this invention will be obvious and explained by reference to the accompanying specification and drawings.

DESCRIPTION OF THE INVENTION

Figure 2:
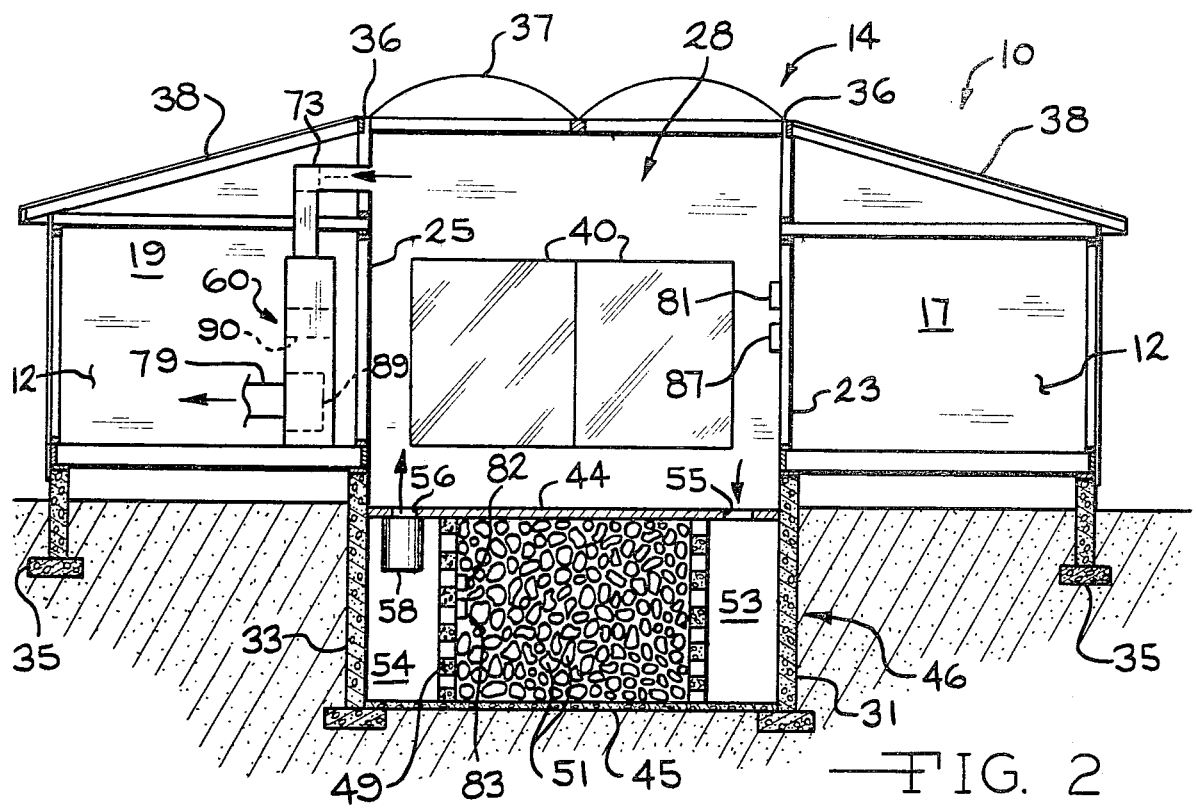
FIG. 2 is a sectional view taken along section line 2—2 of FIG. 1.
Figure 1:
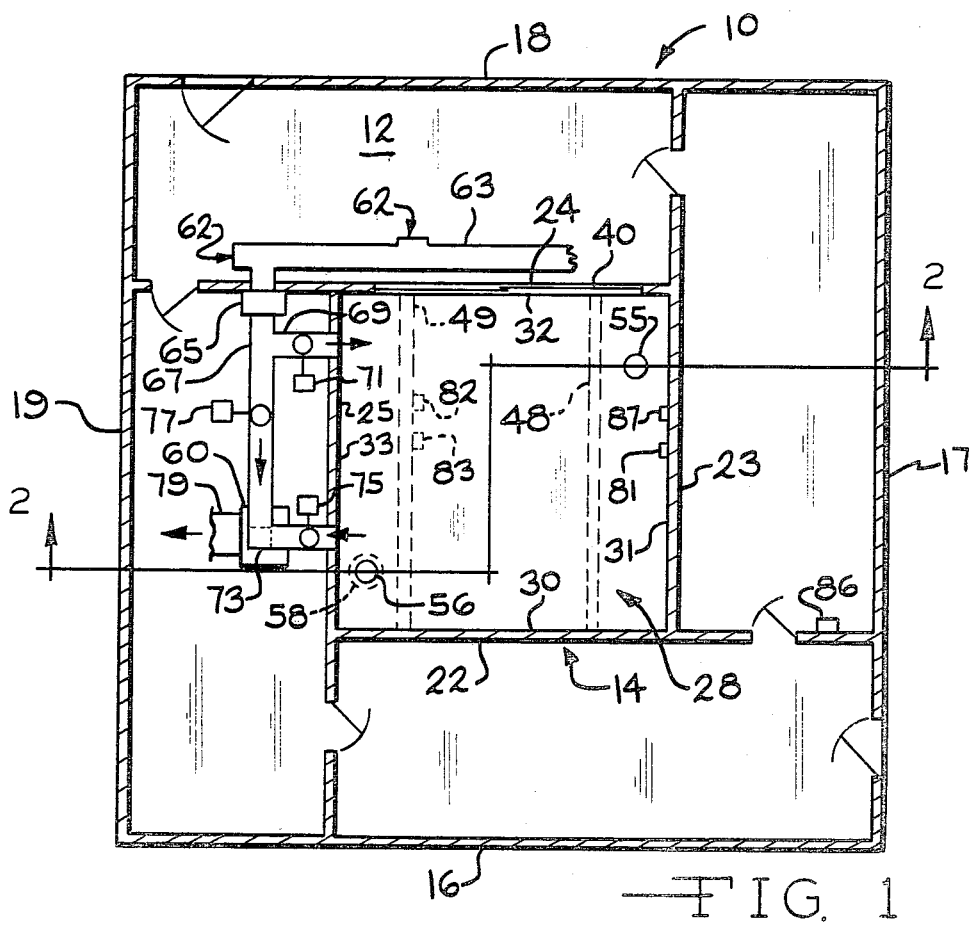
FIG. 1 is a plan view of the building.

As shown in FIGS. 1 and 2, building or dwelling 10 comprises a main section 12 enclosing a central unit or section 14. The main section can be constructed on-site or can be built from prefabricated sections or modules 16, 17, 18, and 19 around the periphery of the central unit. The dual purpose central unit functions as a solar heating system as well as occupiable living space.

Inner walls 22, 23, 24, and 25 of main section 12 are arranged to enclose and define the solar energy collection section 28 of central unit 14. The inner walls 22, 23, 24, and 25 can be substantially co-planar with and can rest upon foundation walls 30, 31, 32, and 33 of the central unit 14, respectively. The balance of the main section can rest upon peripheral foundation 35.

Central roof section or dome 37 covering the central unit can be a single arched dome, or the like, or a dome having a plurality of arches as shown in FIG. 2. The peripheral edge 36 of dome 37 can rest upon the inner walls 22, 23, 24, and 25. The peripheral edge 36 of dome 37 can be contiguous with main roof 38 and sealed therealong to provide a suitable weatherproof roof for the entire structure.

The dome can be a transparent acrylic sheet to permit the passage of solar energy therethrough. That is, the central roof or dome is adapted to permit the passage of solar energy therethrough to heat the air and other contents of solar energy collection section 28. Furthermore, it is believed that the planar area of the transparent section of the roof should be from 25 to 30 percent of the planar area of main section 12 of the building to provide a suitably sized solar heat collection system for geographical areas such as Ohio and the like.

Inner walls 22, 23, 24, and 25 can be equipped with sliding glass doors 40 and the like to provide viewing and access to the courtyard or energy collection section 28 from the other section or sections of the building. Thus, the energy collection section can be isolated from the remainder of the building when desired.

A floor or planar member 44 is joined at the foundation walls 30, 31, 32, and 34 or inner walls 22, 23, 24, and 25 to separate the central unit 14 into an energy collection section 28 and energy storage section or heat storage means 46. Preferably, the floor 44 is joined to foundation walls 30, 31, 32, and 33.

Floor 44, foundation walls 30, 31, 32, and 33 and subfloor 45, which is joined to the foundation walls, also serve to enclose and define the energy storage section 46. Subfloor 45 can be equipped with a drain to remove any moisture that may collect on the subfloor. The energy storage section 28 is enclosed and defined by floor 44, inner walls 22, 23, 24, and 25, and dome 37. If desired, contiguous foundation and inner walls can be constructed as a plurality of vertical members or walls extending from the subfloor to the dome.

A pair of foraminous or air-permeable walls 48 and 49 can extend from the subfloor 45 to floor 44 between a pair of opposed foundation walls. As such, foundation walls 22 and 24 and foraminous walls 48 and 49 provide a suitable enclosure for heat storage mass 51. Such a heat storage mass can consist of commercially available crushed and washed rock of a size sufficient to provide a suitable heat sink and to readily permit air flow therethrough.

The first foraminous wall 48, as shown in FIGS. 1 and 2, is parallel to and spaced from foundation wall 31 to provide a first zone 53 therebetween. Similarly, a second foraminous wall 49 can be parallel to and spaced from foundation wall 33 to provide a second zone 54 therebetween.

A first passageway 55 extends through floor 44 to provide communication between the energy collection section 28 and the first zone 53 of the energy storage section 46. Likewise, a second passageway 56 extends through floor 44 to provide communication between the second zone 54 of the energy storage section 46 and the energy collection section 28. As shown in FIGS. 1 and 2, a fan or air moving means 58, or the like, is positioned at passageway 56 to forcibly move air from the energy collection section 28 through the heat storage mass, and back to the energy collection section by way of zones 53 and 54, foraminous walls 48 and 49, and passageway 55.

The porosity of the foraminous walls can be arranged such that a generally even air flow through the heat storage mass over the length of the foraminous walls can be obtained for more efficient operation.

An alternate heat source 60, such as is commercially available, forced-air type furnace, can be employed to provide heat for the building if the solar heating system should not provide enough heat to adequately heat the building for whatever reason. As shown in FIGS. 1 and 2, the cold air return system for heat source 60 is designed to take advantage of the heat stored and being collected in the central unit 14. The cold air return system withdraws air from the main section 12. As such, cold air return registers 62 are connected to main duct 63, which is connected to the intake side of fan or air moving means 65. The exhaust side of fan 65 is connected to one end of distributor duct 67. The other end of duct 67 is connected to alternate heat source 60 at the intake port thereof.

Adjacent fan 65, exhaust duct 69 branches from distributor duct 67 to form a passageway through the inner wall 25 from the energy collection section 28 to distributor duct 67. Automatic damper 71 is located within the exhaust duct 67 to selectively control the air flow from the energy collection section to distributor duct. Damper 71 can also be of the manually operated type.

Adjacent heat source 60, intake duct 73 branches from distributor duct 67 to form a passageway through inner wall 25 from the energy collection section 28 to distributor duct 67. An automatic damper 75 is located within intake duct 73 to selectively control the air flow therethrough. Damper 75 can also be a manually operated type. Automatic damper 77, located within distributor duct 67 between exhaust duct 69 and intake duct 73, selectively controls the air flow therethrough. Damper 77 can also be a manually operated type. Main heat supply duct 79 extending from heat source 60 directs the heated air into the building via a network of other ducts and registers not shown. Such dampers can be a commercially available type.

Figure 3:
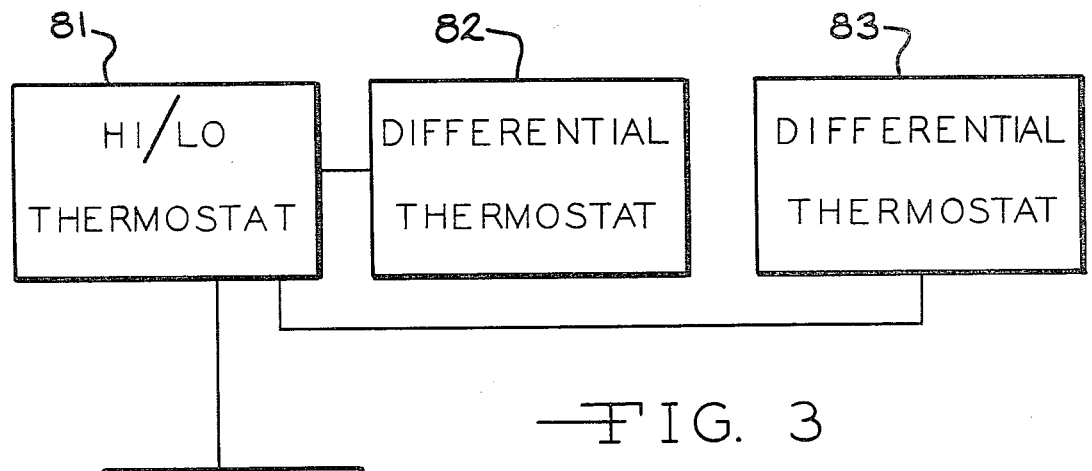
FIG. 3 is a schematic diagram of the control system for controlling the movement of air from the energy collection section through the energy storage section.
Figure 5:
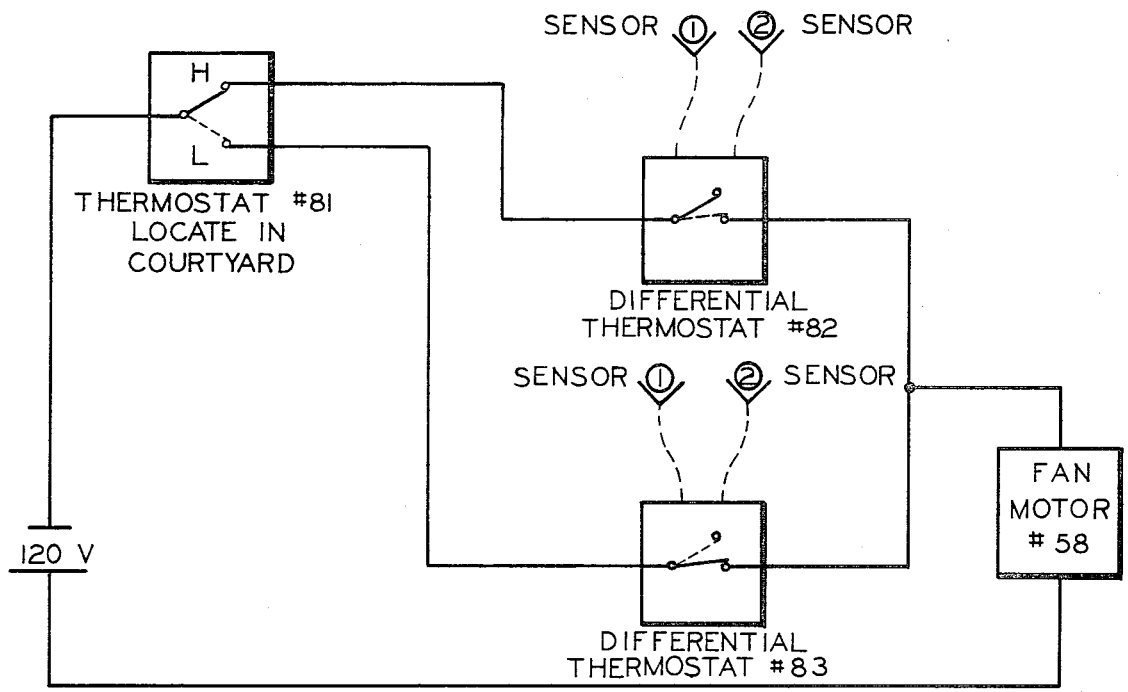
FIG. 5 is a wiring diagram of the control system for controlling the movement of air from the energy collection section through the energy storage section.

To control air distribution throughout the building, commercially available types of thermostats can be employed. In a first control system, a dual acting, or high/low type, thermostat 81 is located in the courtyard or energy collection section 28. Thermostat 81 can be located on inner wall 23, approximately midway between floor 44 and the peripheral edge 36 of dome 37 to obtain an average temperature of the air within the courtyard. A pair of differential thermostats 82 and 83 can be located within the energy storage section 46. Thermostats 82 and 83 can be in contact with the heat storage mass 51. Fan 58 can be electrically interconnected with thermostats 81, 82, and 83 to control the operation of the fan 58. The differential thermostats 82 and 83, as is well known in the art, each include a temperature sensor located in the collection section 28 and another temperature sensor located in the heat storage mass 51. Thermostat 81 can operate such that it will form an electrical path therethrough if the sensed temperature is outside the predetermined range. FIGS. 3 and 5 show a schematic diagram and wiring diagram, respectively of the system for controlling the movement of air from the energy collection section through the energy storage section. The connections and wiring for the thermostats, sensors and fan shown in these figures is well known in the solar heating art.

In operation, if the temperature of the air in the courtyard 28 as sensed by the high/low thermostat 81 is above the high temperature set point and the temperature of the heat storage mass as sensed by differential thermostat 82 is less than the temperature of the air in the courtyard by a preselected amount, thermostats 81 and 82 are adapted to energize fan 58 to move the air in the courtyard 28 through the heat storage mass 51. Thus, thermal energy can be transferred to the mass 51 and stored therein.

If the air temperature in the courtyard as sensed by thermostat 81 is lower than the low temperature set point of thermostat 81 and the temperature of mass 51 is greater than the air temperature in the courtyard by a preselected amount, thermostats 81 and 83 are adapted to energize fan 58 to move air from the courtyard 28 through mass 51, thereby warming the air moving through the mass and back to the courtyard.

In a second control system, a single acting thermostat 86 is suitably located in the main section 12 to sense the air temperature therein. A differential thermostat 87 is located in the courtyard 28, generally adjacent thermostat 81, to sense the air temperature therein.

Figure 4:
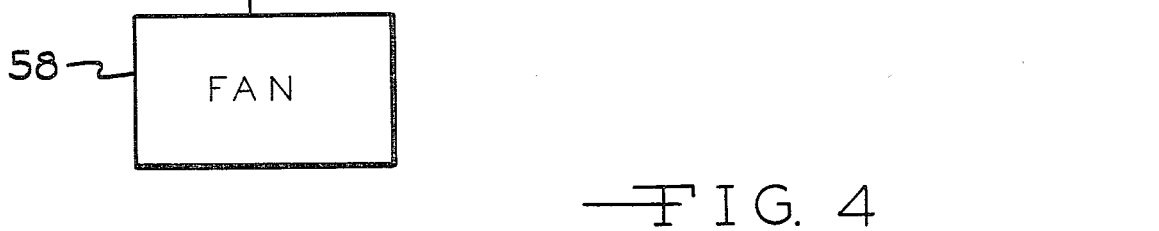
FIG. 4 is a schematic illustration of the system for controlling the movement of the air from the main section alternately through the energy collection section and the alternate heat source for additionally heating the air.
Figure 6:
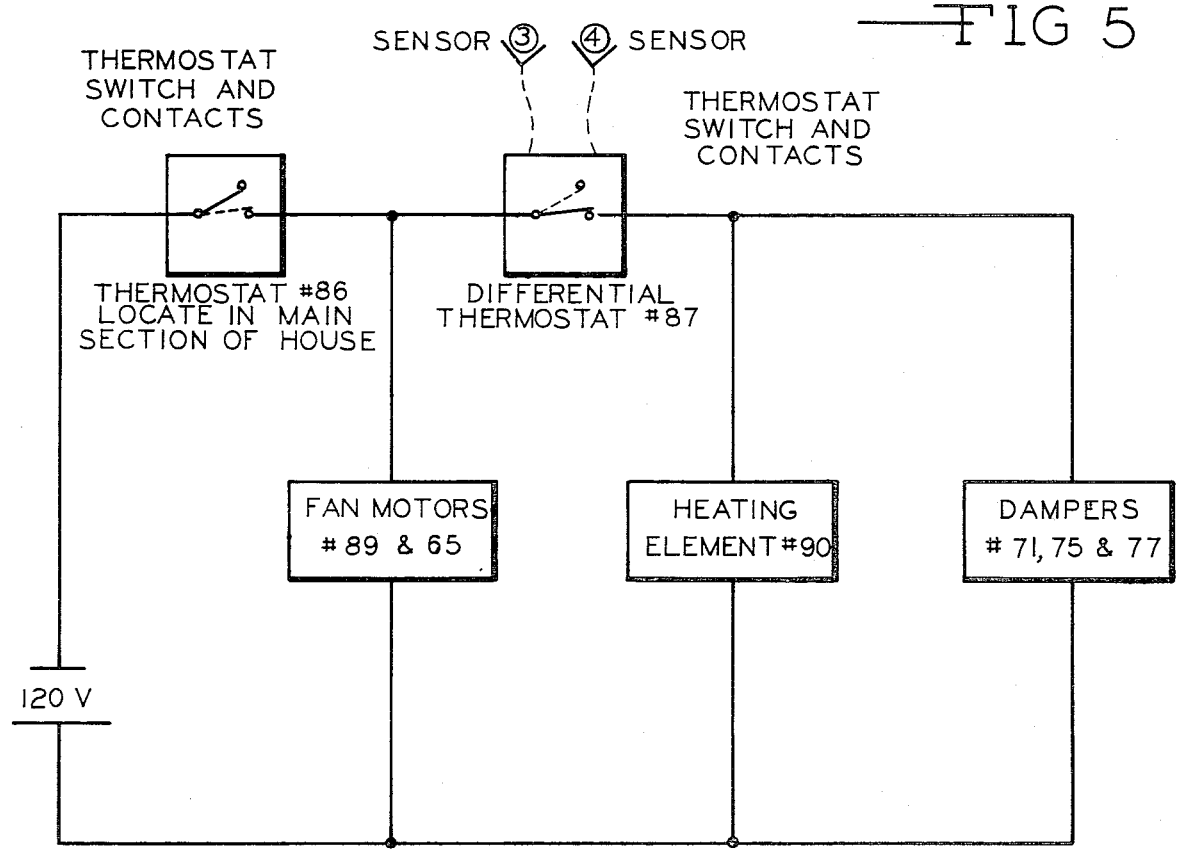
FIG. 6 is a wiring diagram of the system for controlling the movement of the air from the main section alternately through the energy collection section and the alternate heat source for additionally heating the air.

As shown in FIGS. 1 and 2, alternate heat source 60 is forced-air type having a fan 89 and a heating element 90. FIGS. 4 and 6 show a schematic diagram and wiring diagram, respectively of the second control system for controlling the movement of air from the main section alternately through the energy collection section and the alternate heat source for additionally heating the air. The connections and wiring for the thermostats, sensors and fans shown in these figures are well known in the art.

In operation, if the temperature of the air in main section 12 as sensed by thermostat 86 is below a predetermined set-point value and the temperature of the air in the courtyard 28 is greater than the predetermined set-point value of thermostat 86, thermostats 86 and 87 are adapted to energize dampers 71 and 75 to assume the "open" position. When a damper is "open," air is permitted to flow past the damper, and when "closed" air is not permitted to flow past the damper. At that time, damper 77 is energized to move to the "closed" position, and fans 65 and 89 are also energized to move the air therethrough. Thereby, air is withdrawn from main section 12 and moved into courtyard 28 to mix and be warmed by the air therein via duct 62 and fan 65, and the air in the courtyard 28 is moved by fan 89 back into main section 12 via duct 79. At this time, the heating element 90 is not energized, that is, heating the air therearound, since the building can be sufficiently heated by the warmer air in the courtyard. Fan 65 is not absolutely necessary to suitably move the air, as long as the sliding glass doors to the courtyard are closed. However, to achieve a more even heat distribution throughout main section 12, it is prefered that fan 65 be employed.

If the air temperature in the main section 12 as sensed by thermostat 86 is below the preselected set-point value of thermostat 86 and the temperature of the air in the courtyard 28 as sensed by thermostat 87 is less than the set-point value of thermostat 86, thermostats 86 and 87 are adapted to energize dampers 71 and 75 to "close," damper 77 to "open," fan 89 to move air, and heating element 90 to heat the air moving therethrough. Fan 65 can also be energized to move air, but it is not absolutely necessary. Thus, air within main section is moved directly to alternate heat source 60 via ducts 63, 67, and 79 and heated therein in the absence of being first moved through the courtyard 28.

The above-mentioned thermostats can be commercially available models and can be suitably electrically interconnected by commercially available conventional means to function as set forth above. For example, dual acting thermostat 81 and differential thermostats 82, 83 and 87 can be of the type available from the Dayton Manufacturing Company having catalog numbers 2E 206 and 2E 398, respectively.

Alternative distributor duct 67 can be replaced by a horizontally oriented "H" shaped duct (not shown). One end of the lower bar of the "H" is attached to a suitable cold air return line. The other end of the lower bar is attached to the intake side of an alternate heat source. Each half and end of the upper bar communicates with a separate passageway communicating with the courtyard. Within the now vertically oriented crossbar of the "H" shaped system, a single rotatable damper is adapted to direct the air flow either directly through the lower bar or first vertically to half of the upper bar to direct the return air from the main section into the courtyard. The air in the courtyard is then moved through the other half of the upper bar to the alternate heat source to be distributed to the main section without being heated by the heating element in the alternate source similar to that system shown in FIGS. 1-4.

Furthermore, it is prefered that dome 37 be of a "Thermopane" type construction. That is, a pair of parallel, spaced-apart sheets of transparent material form the dome. The space between the sheets can be suitably evacuated, thus reducing convective and conductive heat losses through the dome.

Also, intake duct 73 and passageway 56 can be disposed to provide a coherent bulk air stream from passageway 56 moving upwardly to intake duct 73 through the courtyard when the air is moved through the energy storage section 46. Such an orientation operates such that intake duct or passageway 73 ingests a bulk flow of air having a temperature greater than the remainder of the air in the energy collection section 28 when the air is being moved out of the storage section in the energy retrieval mode, that is, when the heat is being released from the storage mass to the air. Not all the air will be ingested by the intake duct, such that the remainder of the mass of air of the stream will mix with and warm the remaining air in the courtyard.

Suitable ducts and dampers (not shown) can be employed to move fresh air from the exterior of the structure into the courtyard and exhaust stale air from the courtyard as desired.

It will be appreciated that variations and constructional features, as well as substitution of equivalent components, can be undertaken without departing from the spirit and scope of the present invention.

I claim:

1. A building comprising:
   a plurality of sections, having walls arranged to enclose a central unit, said central unit having a courtyard bounded by a roof adapted to permit the passage of solar energy therethrough to heat the courtyard and a floor spaced from the roof;
   a heat-storage section located within the central unit and below said floor;
   means for selectively moving the air within the courtyard through said heat storage means in a heat-exchanging relationship when the temperature of the air at a predetermined location within said courtyard is outside a predetermined range of temperatures;
   an alternate heat source to provide heat for said sections; and
   means for selectively moving air from said sections through the courtyard in a mixing relationship with the air therein before being heated by said alternate heat source when the temperature of the air at a preselected point in the courtyard exceeds the temperature of the air being moved from the sections to the alternate heat source and moves such air directly to the alternate heat source to be heated therein when the temperature of the air being moved from the sections to the alternate heat source exceeds the temperature of the air at a preselected point of the courtyard.

2. A building comprising:
   a solar energy collection section;
   a main section having inner walls enclosing the energy collection section;
   an energy storage section under the energy collection section, the storage section being defined by foundation walls, said inner walls resting upon said foundation walls;
   a roof covering the energy collection section adapted to permit the passage of solar energy therethrough to heat the energy collection section, said roof having a peripheral edge thereof resting upon said inner walls;
   a floor spaced from the roof to separate the storage section from the collection section;
   means for selectively moving air within the energy collection section through the energy storage section in a heat-exchanging relationship when the temperature of the air at a predetermined location within said courtyard is outside a predetermined range of temperatures;
   an alternate heat source to provide heat for said sections; and, means for selectively moving air from said sections through the courtyard in a mixing relationship with the air therein before being heated by said alternate heat source when the temperature of the air at a preselected point in courtyard exceeds the temperature of the air being moved from the sections to the alternate heat source and moves such air directly to the alternate heat source to be heated therein when the temperature of the air being moved from the sections to the alternate heat source exceeds the temperature of the air at a preselected point of the courtyard.

3. A building comprising:
a solar energy collection section;
a main section having inner walls enclosing the energy collection section;
an energy storage section under the energy collection section, the storage section being defined by foundation walls, said inner walls resting upon said foundation walls;
a roof covering the energy collection section adapted to permit the passage of solar energy therethrough to heat the energy collection section, said roof being attached at and resting upon said inner walls;
a floor spaced from the roof to separate the storage section from the collection section;
a subfloor spaced from and below said floor contiguous with the foundation walls to further define the energy storage section;
a first foraminous wall spaced from one of said foundation walls extending from the floor to the subfloor to define a first zone between the first foraminous wall and such foundation wall;
a second foraminous wall spaced from the foundation wall opposite the foundation wall defining the first zone to define a second zone between the second foraminous wall and the foundation wall opposite the foundation wall defining the first zone, said second foraminous wall extending from the floor to the subfloor, the floor having a first passageway communicating with the first zone and the collection section and having a second passageway communicating with the second zone and the collection section;
a heat storage mass within the storage section and between the first and second zones;
means for selectively moving air within the energy collection section through the heat storage mass and back to the energy collection section, the first and second zones and foraminous walls cooperating to distribute such moving air throughout the heat storage mass;
an alternate heat source for supplying heated air to said main section; and
means for controlling the air flow in the building such that the air from the main section can be moved through the courtyard in a mixing relationship with the air therein before being heated by said alternate heat source.

4. The building of claim 3 wherein one of said inner walls has an air-intake passageway communicating with the alternate heat source and the energy collection section, said air-intake passageway and said first passageway being disposed to provide an air stream from the first passageway to the air-intake passageway when the air is moved through the heat storage mass such that the air-intake passageway ingests a substantial portion of such air stream before the air of the stream is distributed throughout the collection section.

5. The building of claim 4 wherein the air-intake passageway ingests a bulk flow of air having a temperature greater than the remainder of the air in the collection section at the level of the air-intake passageway at such inner wall.

6. The method of controlling the movement of air from an energy collection section to an energy storage section and a main section of a building comprising:
(a) sensing the temperature of the air within the energy collection section;
(b) sensing the temperature of a heat storage mass;
(c) moving the air within the collection section through the mass when the temperature differential between the air of the collection section and the mass is greater than a preselected value in response to items "a" and "b";
(d) sensing the temperature of the air within the main section; and
(e) moving the air from the main section (i) through the collection section if the temperature of the air in the collection section is greater than the preselected temperature in the main section or (ii) directly to an alternate heat source for heating in the absence of moving such air through the collection section if the temperature of the air in the collection section is less than the preselected temperature in the main section in response to said sensings of items "a" and "d."

* * * * *